United States Patent
Ramstrum, Jr.

(10) Patent No.: US 10,854,090 B2
(45) Date of Patent: Dec. 1, 2020

(54) COLLISION AVOIDANCE SYSTEM AND METHOD FOR A WATERCRAFT

(71) Applicant: United States of America as represented by the Secretary of the Navy, San Diego, CA (US)

(72) Inventor: Gunnar Gustaf Ramstrum, Jr., Bonita, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 243 days.

(21) Appl. No.: 16/143,626

(22) Filed: Sep. 27, 2018

(65) Prior Publication Data

US 2020/0105143 A1 Apr. 2, 2020

(51) Int. Cl.
| | |
|---|---|
| *G08G 3/02* | (2006.01) |
| *G01C 21/20* | (2006.01) |
| *B63B 43/18* | (2006.01) |
| *G05D 1/02* | (2020.01) |
| *B63B 49/00* | (2006.01) |
| *G01S 13/937* | (2020.01) |

(52) U.S. Cl.
CPC ............. *G08G 3/02* (2013.01); *B63B 43/18* (2013.01); *B63B 49/00* (2013.01); *G01C 21/203* (2013.01); *G05D 1/0206* (2013.01); *G01S 13/937* (2020.01)

(58) Field of Classification Search
CPC .......... G08G 3/02; B63B 43/18; B63B 49/00; G01C 21/203; G05D 1/0206; G01S 13/937
See application file for complete search history.

(56) References Cited

U.S. PATENT DOCUMENTS

| 4,313,115 | A | 1/1982 | O'Sullivan | |
|---|---|---|---|---|
| 4,466,068 | A | 8/1984 | Degre et al. | |
| 4,623,966 | A | 11/1986 | O'Sullivan | |
| 6,469,664 | B1 * | 10/2002 | Michaelson | G01C 21/00 342/357.31 |
| 7,679,530 | B2 | 3/2010 | Waquet | |
| 8,612,085 | B2 | 12/2013 | Flohr et al. | |

(Continued)

FOREIGN PATENT DOCUMENTS

| EP | 3141924 A1 | 3/2017 |
|---|---|---|
| KR | 101693982 B1 | 1/2017 |

(Continued)

*Primary Examiner* — Calvin Cheung
(74) *Attorney, Agent, or Firm* — Naval Information Warfare Center, Pacific; Kyle Eppele; J. Eric Anderson

(57) ABSTRACT

A collision avoidance system and method for a watercraft for computing, visualizing, programming, and executing ship and hazard avoidance. The collision avoidance system and method employs a map visualization, a linear visualization, and a courses of action visualization to automatically provide a clear visualization of threats in real time in a manner which improves operator awareness for timely decision making and avoidance actions. In this regard, the collision avoidance system and method operate to reduce unwanted or unneeded information, ensure the visualization is task oriented as opposed to function oriented, ensure the visualization is intuitive, keep the key measures of the visualization consistent, and automate the searching of hazards across all charts and automate the closest point of approach in both distance and time of nearby tracks.

20 Claims, 5 Drawing Sheets

(56) References Cited

U.S. PATENT DOCUMENTS

| | | |
|---|---|---|
| 8,949,015 B2 | 2/2015 | Choi |
| 9,292,971 B2 | 3/2016 | Lima et al. |
| 9,418,558 B1 | 8/2016 | Stamenkovich et al. |
| 9,865,167 B1 * | 1/2018 | Liang ................ G08G 3/02 |
| 2009/0167592 A1 * | 7/2009 | Kao .................... G08G 3/02 |
| | | 342/41 |
| 2010/0153013 A1 * | 6/2010 | Kondo ................ B63B 49/00 |
| | | 701/301 |
| 2011/0144912 A1 * | 6/2011 | Lee ...................... G08G 3/00 |
| | | 701/301 |
| 2012/0274504 A1 | 11/2012 | Kubota |
| 2013/0009792 A1 * | 1/2013 | Shafaat ............. G08G 5/0021 |
| | | 340/979 |
| 2013/0238232 A1 * | 9/2013 | Choi ..................... G08G 3/02 |
| | | 701/301 |
| 2014/0003193 A1 * | 1/2014 | Schmidt ............... G08G 3/02 |
| | | 367/88 |
| 2014/0067249 A1 | 3/2014 | Gagliardi et al. |
| 2015/0005785 A1 | 1/2015 | Olson |
| 2015/0042505 A1 * | 2/2015 | Hope ..................... G01S 5/06 |
| | | 342/41 |
| 2015/0278734 A1 * | 10/2015 | Grant ................. E21B 41/0092 |
| | | 705/7.23 |
| 2015/0330803 A1 * | 11/2015 | Okuda ............... G01C 21/3691 |
| | | 701/487 |
| 2016/0101838 A1 * | 4/2016 | Kojima ................ B63H 25/04 |
| | | 701/21 |
| 2016/0125739 A1 | 5/2016 | Stewart et al. |
| 2017/0284808 A1 * | 10/2017 | Saito ................... G01C 21/203 |
| 2017/0365175 A1 * | 12/2017 | Harnett ................ B63B 43/18 |
| 2019/0251849 A1 * | 8/2019 | Jeong .................. B63B 43/18 |

FOREIGN PATENT DOCUMENTS

| | | | |
|---|---|---|---|
| WO | 2008009269 A1 | 1/2008 | |
| WO | 2008031880 A3 | 6/2008 | |
| WO | WO 2011/027037 A1 * | 3/2011 | ............... G08G 3/02 |

\* cited by examiner

COLLISION AVOIDANCE SYSTEM AND METHOD FOR A WATERCRAFT

STATEMENT OF GOVERNMENT INTEREST FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil. Reference Navy Case No. 103,716.

BACKGROUND

Field of the Invention

This disclosure relates generally to a collision avoidance system and method for a watercraft seeking to navigate to a desired endpoint.

Description of the Prior Art

Ships and other watercraft must be constantly concerned about protecting their own ship and avoiding potential collisions and hazards. The challenge this presents is compounded when the awareness and avoidance relates to other things that are moving, including other ships. In addition, when hazards from charts or from ad hoc inputs from intelligence are added, what is already a complex multi-layered environment can become impossibly cluttered and impossible to fully account for.

Traditionally, ships do their best to keep a complex chart of their location, course, and potential threats using radar, lights and other visual cues, experience, plans, and radio communications. Indeed, with the significance of collision damage and with little or no assistance on the high seas, constant vigilance and rapid reaction is needed at all times. But the complexity of combing input modalities manually and the translation and mapping onto a detailed geographic-based layout makes for a non-intuitive, costly visualization effort that consumes time and cognitive effort which can lead to mistakes, confusion, and misjudgments.

Thus, there remains a need for a collision avoidance system and method for watercraft that automatically provides a clear visualization of threats in real time in a manner which improves operator awareness for timely decision making and avoidance actions.

SUMMARY

The present disclosure describes a collision avoidance system and method for a watercraft for computing, visualizing, programming, and executing ship and hazard avoidance. Closest point of approaches ("CPA") are computed on nearby ship tracks with an estimation where the ownship will be and when it will be there. Hazards from charts and that are manually input are also computed as avoidance objects with the CPA computed on the hazards relative to the planned ownship track.

In accordance with an embodiment of the present disclosure, the collision avoidance system and method includes the steps of monitoring, by a computer, selected objects in a predetermined geospatial area, wherein each of said selected object includes at least one of a position, a speed, and a course; designating an ownship planned track for an ownship, wherein the ownship planned track passes through the predetermined geospatial area; calculating by said computer at least one of a closest point of approach value and a shortest time to transit value for at least one monitored object among said selected objects relative to the ownship planned track based on at least one of the location, the speed and the course of the at least one monitored object; and generating, by said computer, a map visualization that visually represents each selected object and the ownship planned track spatially on the predetermined geospatial area, and, if the at least one of the closest point of approach value and the shortest time to transit value is below a predetermined distance threshold, visually representing where along the ownship planned track the at least one monitored object will be closest to the ownship.

DETAILED DESCRIPTION

Described herein is a collision avoidance system and method for a watercraft that is seeking to navigate to a desired endpoint. Applicant's collision avoidance system and method operate to reduce unwanted or unneeded information, ensure the visualization is task oriented as opposed to function oriented, ensure the visualization is intuitive, keep the key measures of the visualization consistent, and automate the searching of hazards across all charts and automate the closest point of approach in both distance and time of nearby tracks. Accordingly, Applicant's collision avoidance system and method provide a visualization system and a supporting system which has the ability to improve operator performance and avoidance of collisions.

The collision avoidance system and method disclosed herein may generate three visualizations. In a map visualization, the CPA and time from planned ownship location are plotted directly on the map at critical locations to avoid collision, showing where the ships will be closest to the ownship track with tick marks per minute for how long in time the ships/objects will be away from ownship assuming constant speed and course of nearby traffic. The plot is dynamic when there are changes in ownship and nearby ship speeds and courses.

In a linear visualization, the ownship track is plotted as a straight line, showing where and when ships and hazards will be closest to ownship. Ownship track is represented as a one dimensional straight line. When and where ships will be closest to the planned ownship track is shown, both ahead and behind the current position. This visualization enables the operator to immediately understand avoidance needs from the ships and hazards. And as with all visualizations, the plot is dynamic so when there are changes in ownship and nearby ship speeds and courses and/or when ad hoc hazards are added to the navigation area, the visualization may automatically update.

In a courses of action visualization, various courses of action ("COA") to avoid collisions or increase distances from ships and hazards are provided as options. Users can set parameters to find different COAs in order to maintain the same ownship planned track but vary ownship speed, keep the arrival time the same, and/or modify waypoints while minimizing changes to transit. The output of the courses of action visualization provides immediate clarity as to how potential changes to the different parameters affect CPA values, thereby enhancing operator awareness for improved timeliness of decision-making and avoidance actions.

Figure 1:
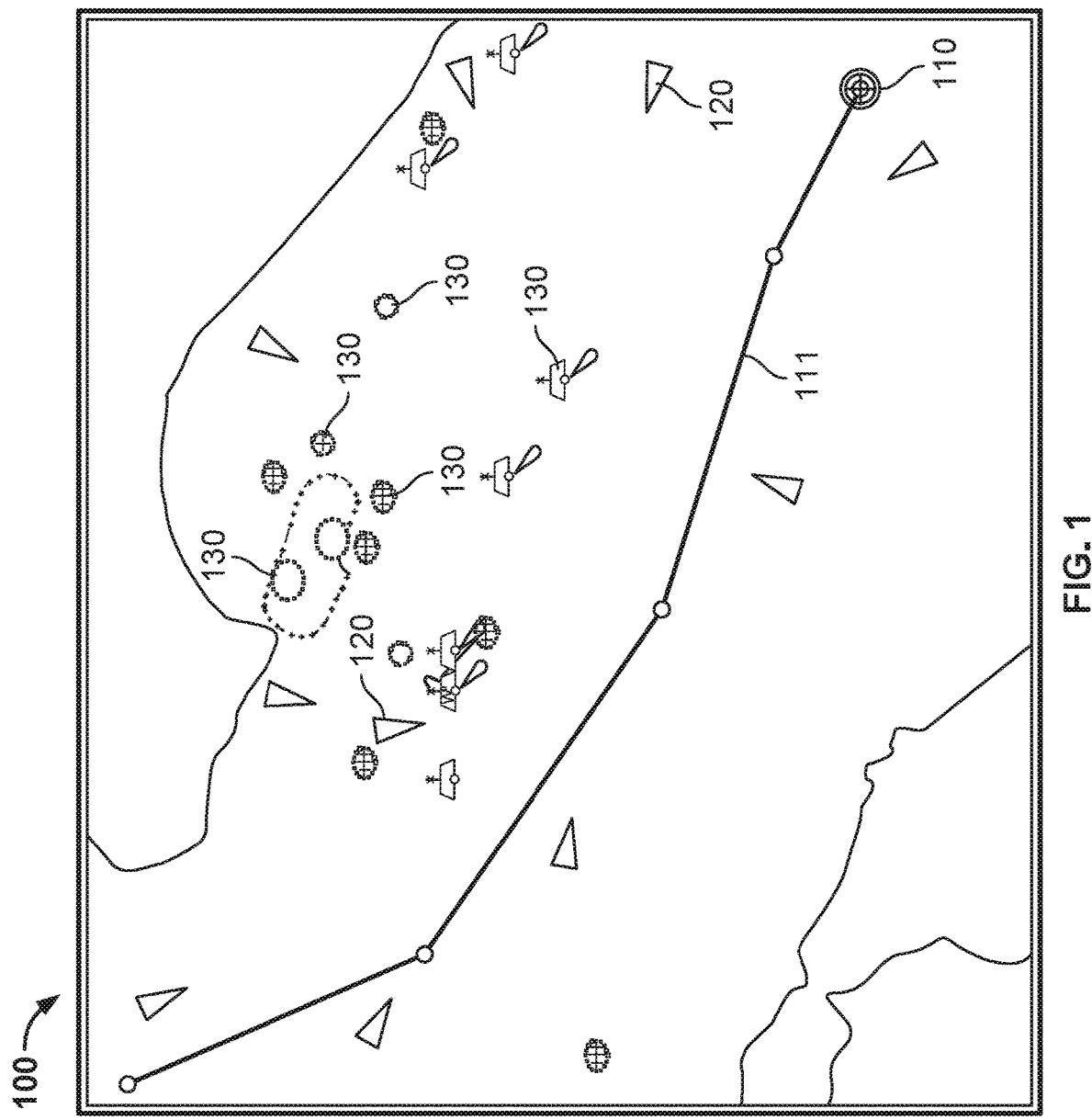
FIG. 1 shows an example of a screen shot of a navigational-complexity map visualization.

Referring now to the drawings, and in particular, FIG. 1, an example of navigation complexity from ships and hazards screenshot 100 shows ownship 110, ownship track 111, nearby ships 120 having known course and speed and which must be avoided, and various hazards 130, which may include buoys and beacons, depth areas, land boundaries, hazards, obstructions and reefs. This base output may be provided using digital chart data from the Digital Nautical Charts ("DNC") all libraries and Tactical Ocean Data ("TOD") charts which are approved for navigation and supplied by the National Geospatial Intelligence Agency ("NGA"). These charts have four libraries of chart information based on the map zoom level. The furthest out chart is the General chart, followed by the Coastal, then the Approach, and then finally the Harbor. The GeoSym specification, which details standardized geospatial symbols, is used to symbolize these charts. In these charts are hundreds of features which a user can choose as being hazards to ownship. Examples of hazards in Applicant's collision avoidance system and method include reefs, rocks, wrecks, obstructions and cables.

Looking at these charts alone, the navigation complexity is compounded in many ways. For example, users cannot easily read dense charts filled with possibly hundreds or thousands of hazards in a given small area. When using a typical Electronic Chart Digital Information System ("ECDIS"), charts only appear at specific zoom levels and having to switch between charts to avoid hazards is time consuming, stressful and very difficult. Moreover, in certain areas of the world, ship traffic can be very dense. In this instance, FIG. 1 shows the General library DNC with buoys and beacons, depth areas, land boundaries, general hazards, obstructions and reefs plotted with ten (10) simulated ships 120 (only some of which are labeled for the sake of clarity).

Figure 2:
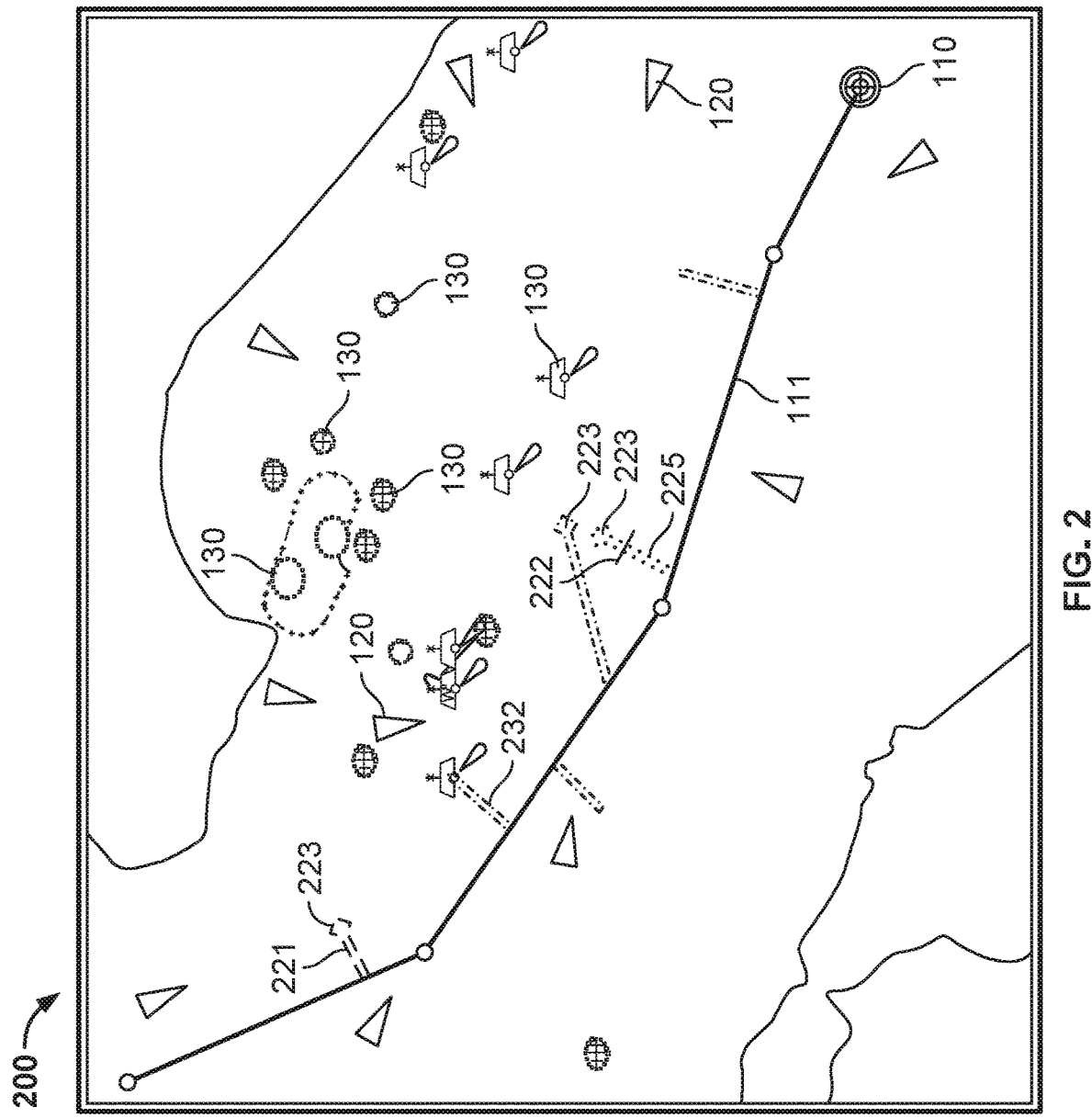
FIG. 2 shows an example of a screen shot of a navigational complexity map visualization with collision avoidance indicators in accordance with the present disclosure.

Referring now to FIG. 2, an example of a collision avoidance screenshot with map visualization 200 provides a map visualization showing ownship 110, ownship track 111, nearby ships 120 to avoid, and various hazards 130 to avoid, measured against distance and time. The ownship track 111 is plotted with nearby ships CPA 120 and the nearby hazard CPA 130 directly on the map. Each ship 120 is monitored to collect its current speed and course. In FIG. 2, CPAs in general along ownship track are plotted with dashed lines (such as the dashed lines 221) representing high warning of a close collision, dotted lines (such as dotted lines 225) representing medium warning, and dot-dash lines (such as lines 232) representing low warning. While dashed, dotted, and dot-dashed lines are used in FIG. 2, it is to be understood that in operation, the CPA may be depicted in different colors to represent different warning levels. CPAs out of range from the low warning may not be plotted since there is ample time and distance while the collision threat is negligible.

CPA lines are drawn based on user settings that indicate either a CPA below a defined threshold or "shortest time to transit." "Shortest time to transit" is computed knowing the planned ownship's track (waypoints, course, speed) and assumes the course and speed of other ships are constant. New CPAs may be computed whenever there are changes in speed and course or when new ad hoc hazards are manually added to the system by operators, and added as a CPA line if within a threshold. For example, a dashed CPA line may indicate a high alert threshold being a ship or hazard that is within 2 kiloyards (kyds) or 1 minute, while a dotted CPA line may indicate a moderate alert threshold being a ship that is within 3 kyds or 2 minutes. Tick marks 222 may be placed along the CPA line, with each tick representing 1 minute. Tick marks 222 allow for a quick and clear understanding of the severity of the CPA in time. The length of the CPA line indicates the distance from the planned ownship track to the other ship's CPA line. CPA lines that are inbound toward the planned ownship track are of greater threat and have a small diamond 223 on the end of the line.

Figure 3:
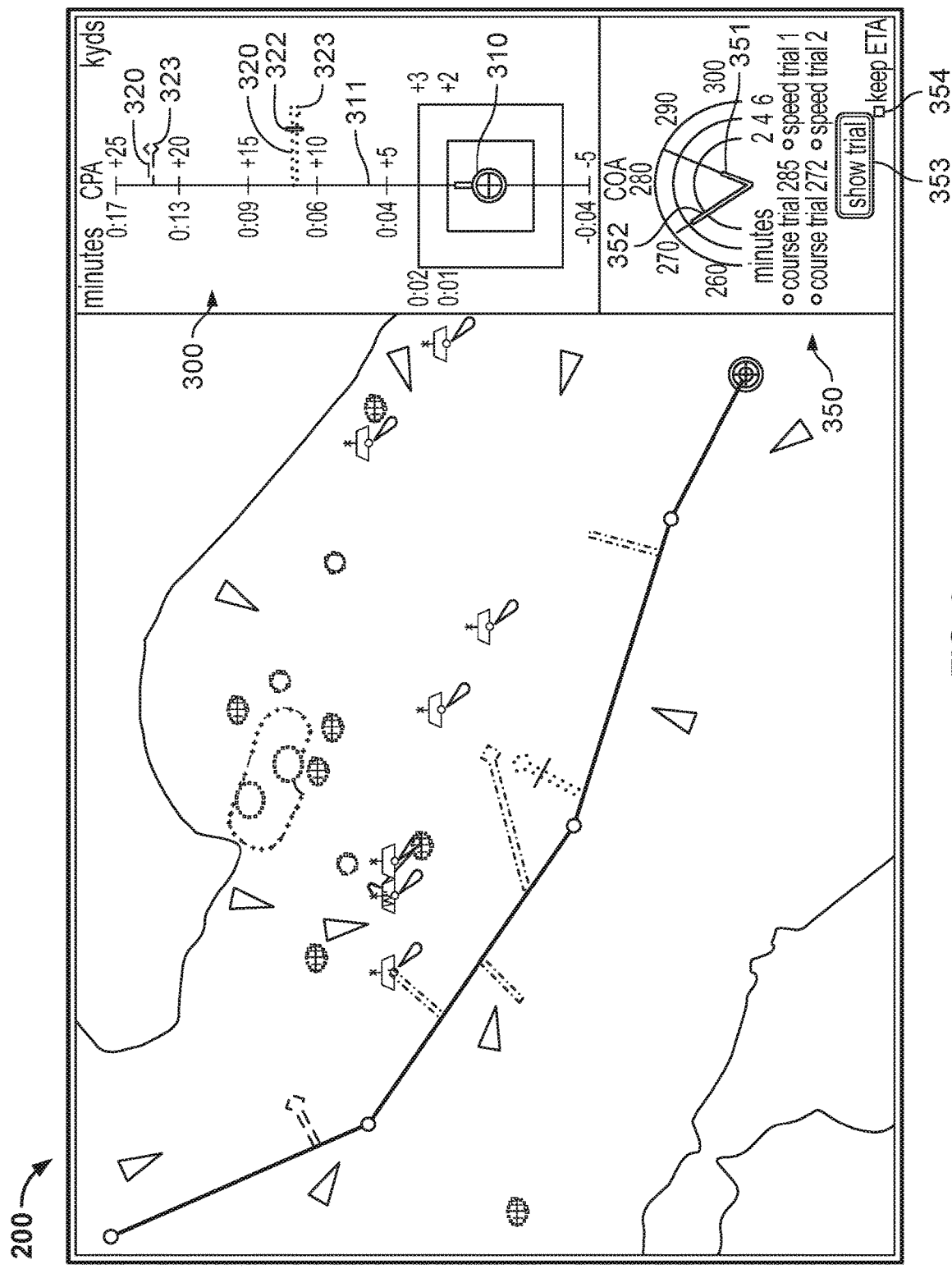
FIG. 3 shows an example of a screen shot of a navigational complexity map visualization with collision avoidance indicators along with a linear visualization and a course of action visualization in accordance with the present disclosure.

Referring now to FIG. 3, an example of a collision avoidance screenshot with the map visualization 200, a linear visualization 300, and a courses of action visualization 350 provides, in addition to the map visualization 200 described with reference to FIG. 2, the linear visualization 300 with planned ownship track 311 with CPA indicators 320 of ships and/or hazards, measured against distance and time, and the courses of action visualization 350 which allows the operator to set parameters when computing actions that will improve the CPA distance from nearby ships and hazards and increase the time away from moving ships. In the linear visualization 300, the ownship track 311 is plotted with CPA indicators 320 for nearby ships and hazards alongside the map visualization 200. It is contemplated that the same monitoring and computation is being performed for the linear visualization 300 as the map visualization 200. Both visualizations are desirable because while the linear visualization can assist in instantaneous recognition of threats, the map visualization 200 may be helpful to understand changes in CPAs during navigation as the ownship 110 moves or other ships move.

The ownship track 311 is represented in the linear visualization 300 as a straight line. Future waypoints are in front of the planned ownship icon 310 while recent past movements are represented below ownship icon 310. The distance in front of the ownship icon 310 represents the ownship track 311 and where and when CPAs will occur. Ships that are currently starboard to the ownship track 311, are drawn on the right side of the vertical ownship track 311. Ships that are currently port to transit, are drawn on the left side of vertical ownship track 311. If a ship crosses the ownship track 311, its CPA indicator 320 is switched to the other side during that time. This arrangement allows for understanding looking at ships relative to the map's transit.

As with the map visualization, the linear visualization may employ a dashed CPA line may indicate a ship or hazard that is within 2 kyds or 1 minute, a dotted CPA line may indicate a ship that is within 3 kyds or 2 minutes, and tick marks 322 may be placed along the CPA line, with each tick is representing 1 minute. CPA lines that are inbound toward the planned ownship track are of greater threat and have a small diamond 323 on the end of the line.

The courses of action visualization 350 as a default may show a first upcoming navigational course 351 and a second upcoming navigational course 352 (each coming after a waypoint). Exemplified in FIG. 3 is a first upcoming navigational course 351 defined by a heading of 285 degrees upcoming in 1 minute and a second upcoming navigational course 352 upcoming in 4 minutes.

The courses of action visualization 350 may also be used to generate computations of CPAs in light of hypothetical ownship parameters. In this regard, a hypothetical first navigational course and a hypothetical second navigational course can be designated, along with hypothetical speed parameters for each navigational course. A computation may be run in response to actuation of a show trial selector 353, with the option to preserve the same estimated time of arrival through a keep ETA selector 354. Once the computation is run, the results may be displayed on the map visualization and/or the linear visualization.

It is contemplated that information gleaned from the hypotheticals may give the operators choices, as decision aids, and feedback visualizations to support the choices before actually switching to the course of action as operators may simply set their preferences to the COAs and choose an action and see the estimated CPA results change on the map or linear visualizations before committing to the change.

Figure 4:
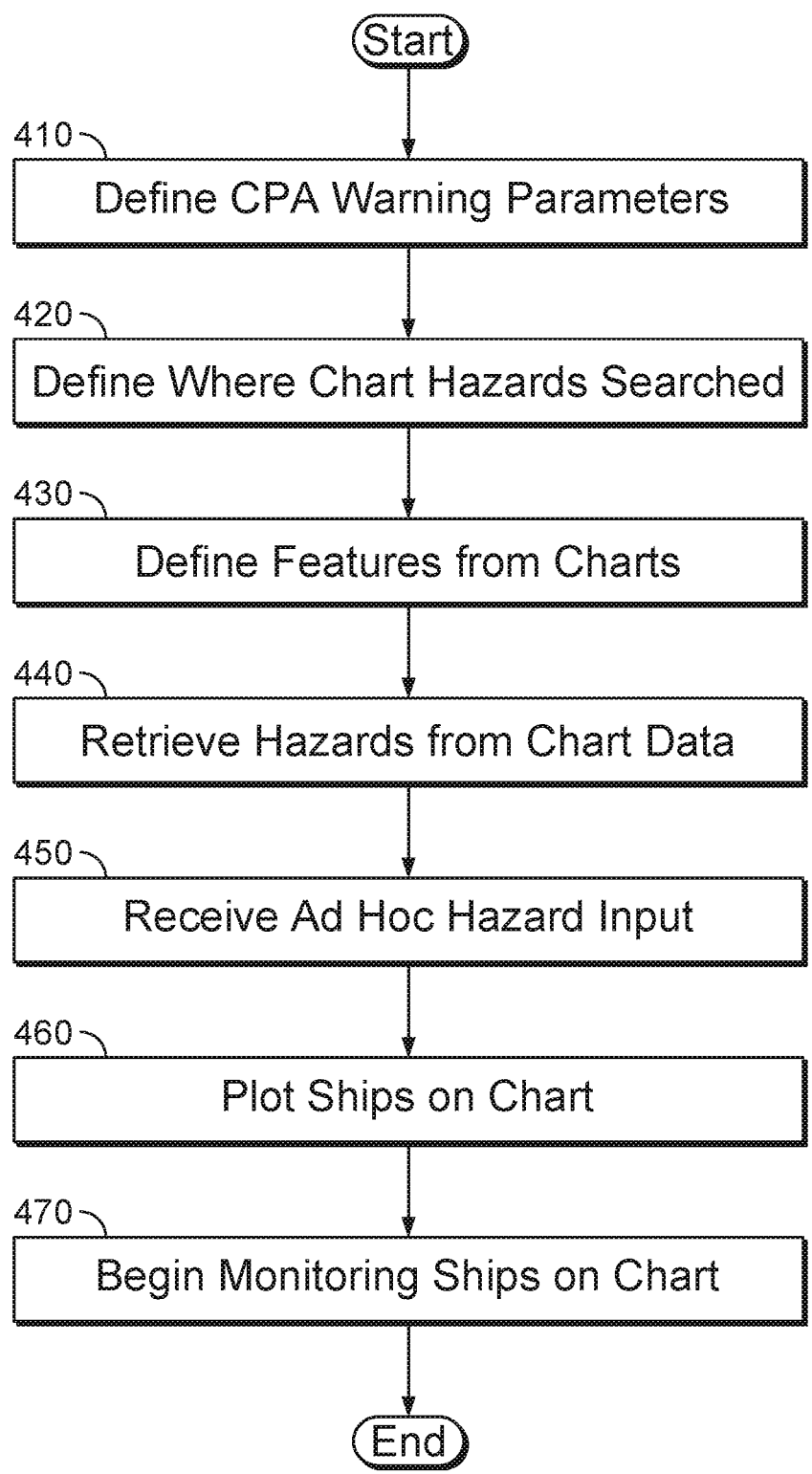
FIG. 4 shows the steps through which a collision avoidance system initializes a navigational complexity map visualization in accordance with the present disclosure.

Referring now to FIG. 4, the process through which a collision avoidance system, operating on a computer system having access to a processor, a visual user output interface (such as an electronic visual display), and instructions for performing the following initialization steps embodied in software that is accessible to the processor, begins with an operator defining the CPA warning parameters for a high alert threshold and a moderate alert threshold (based on time and distance of ship or hazard to planned ownship track) at step 410. The operator may then define where chart hazards are searched and where the next few legs of ownship planned track will traverse at step 420. The operator may then define which features from charts are hazards (e.g. rocks, reefs) at step 430. The collision avoidance system may then automatically find and retrieve all hazards across all chart sources for data (e.g. DNC, TOD) at step 440. The collision avoidance system or the operator may also define chart hazards which require buffers which makes their area larger (e.g. buffer all reefs by 2 kyds) and have buffers computed around such hazards. The operator may optionally input "ad hoc" hazards (which may be from intelligence sources) at step 450. The collision avoidance system may then automatically plot ships on the chart and update with their actual location updated periodically (e.g. every 1 to 5 seconds) at step 460. In this regard, the collision avoidance system may begin automatically monitoring speed and courses of all ships in the hazard vicinity or may enter the hazard vicinity while ownship planned track will traverse at step 470.

It is contemplated that the computer system may have access to the processor, visual user output interface, and software by way of the processor and visual user output interface being housed in an individual computer along with memory containing the software, with each of these components connected inside the individual computer. On the other hand, the computer system may have access to the processor, visual user output interface, and software by way of the processor, visual user output interface, and/or memory containing the software being housed over a plurality of computers that are networked together.

Figure 5:
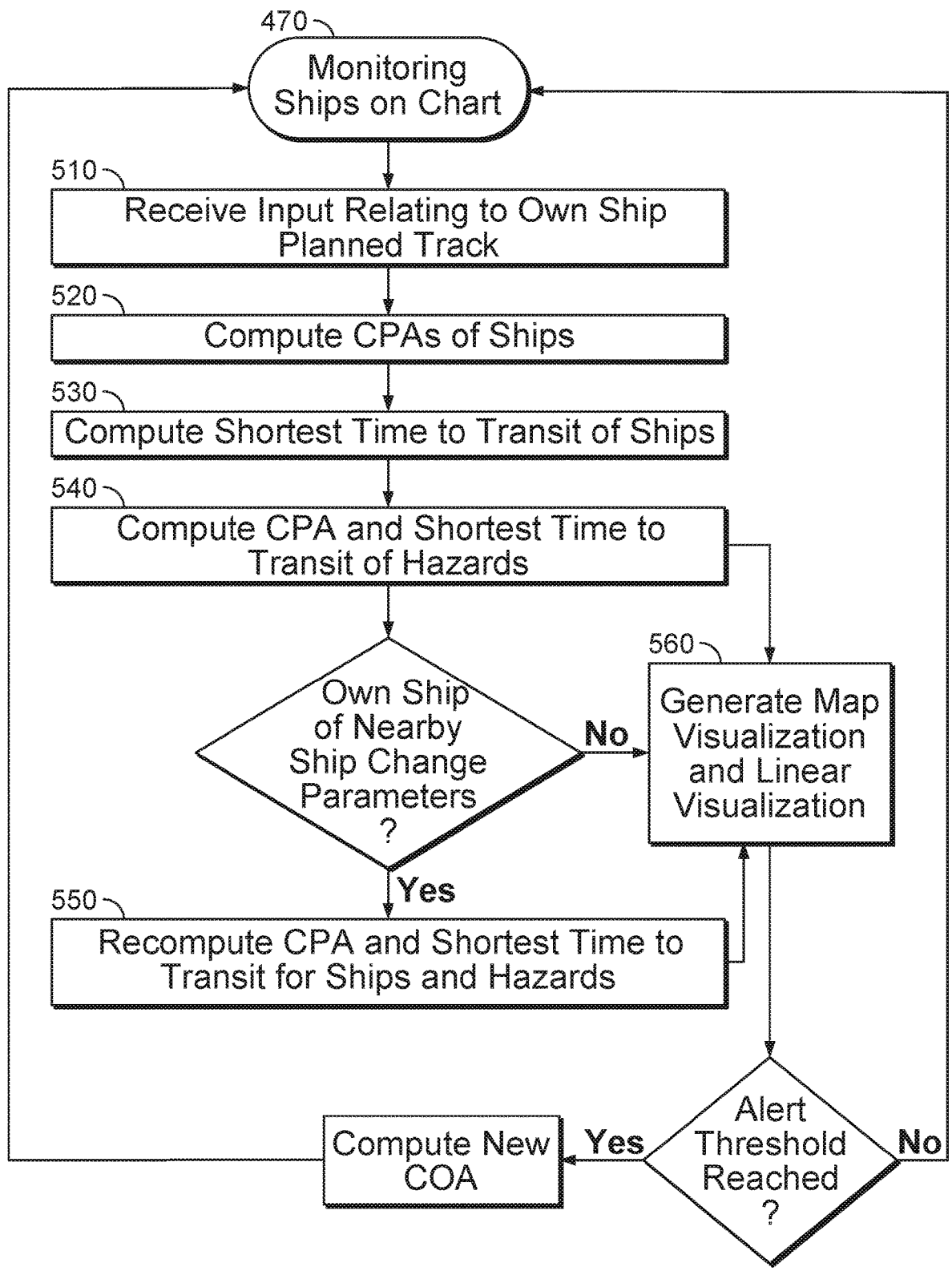
FIG. 5 shows the steps through which a collision avoidance system generates and employs a navigational complexity map visualization with collision avoidance indicators, a linear visualization, and a course of action visualization in accordance with the present disclosure.

FIG. 5 is a flowchart of an example process through with an initialized collision avoidance system may generate and employ visualizations. In this example process, the collision avoidance system has access to the processor, the visual user output interface, software for performing the initialization steps, and software containing instructions for performing the following visualization steps. The example process begins with the collision avoidance system monitoring speed and courses of all ships that are in the hazard vicinity or that may enter the hazard vicinity according to method step 470 from FIG. 4. At step 510, the operator inputs an ownship planned track, including waypoints, speed, course and depth. It is contemplated that the courses of action visualization may be employed to input or update some or the entire ownship planned track. The collision avoidance system may then automatically compute CPAs of nearby ships at step 520. The collision avoidance system may also automatically compute "shortest time to transit" of nearby ships at step 530. The collision avoidance system may then compute CPA and "shortest time to transit" of identified hazards at step 540. Then, any time either ownship or nearby ships change speed, course or depth, the collision avoidance system may then recompute CPAs and "shortest time to transit" at step 550. Each time the collision avoidance system computes or recomputes CPAs and "shortest time to transit," the collision avoidance system may update the map visualization and linear visualization at step 560. Simultaneously, COA may be computed or recomputed if moderate alert threshold or a high alert threshold for a CPA exists or changes at step 570.

In operation, the collision avoidance system is able to visually represent information that may be pertinent to avoiding collisions with clarity and immediacy so as to improve operator avoidance awareness for improved timeliness of decision-making and avoidance actions. For example, such information presented in text may appear as follows: "a specified ownship track will have a CPA of 4.5 kiloyards in 14.5 minutes, bearing 45 degrees from ownship, on an inbound course of 270 degrees, which, at that time, with its current speed of 8 knots, will have a closest time to ownship of 16.7 minutes." Having to read and project how such information, when presented as text, may limit how quickly and effectively an operator can effectively respond to it. By automatically keeping a real time representation of such information, including constantly updated computations of map and linear visualizations, the collision avoidance system and method is able to present such information in an actionable form as well as present viable alternatives as information changes.

It is contemplated that the present disclosure may be extended to applications beyond ship and hazard avoidance, to include any application wherein tracks (i.e., paths in space and time) of any objects desired to be avoided are to be viewed and understood in terms of their present and future intersection with a known track.

The collision avoidance system and method for watercraft is operative to provide affirmative solutions to the following queries: (1) is my upcoming transit safe for navigation, where ships have ample distance from my planned ownship track; (2) is my upcoming transit safe for navigation, where hazards have ample distance from my planned ownship track; (3) which ships will be close to my planned ownship track; (4) what ships will be on a close approach to my planned ownship track; (5) how much time exists between a ship and my planned ownship track assuming the ship maintains its current speed and course to approach my planned track; (6) which hazards (across all chart data or ad hoc) are close to my planned ownship track; (7) how can the planned ownship track be slightly modified in speed to avoid collisions or give greater distance between ships and hazards along the ownship planned track, with an option of still arriving on time at a specific location; and (8) how can the ownship track waypoints be slightly modified to avoid collisions or give greater distance between ships and hazards?

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A collision avoidance method for a watercraft navigating to a desired endpoint, comprising the steps of:
    monitoring, by a computer system having access to at least one processor and at least one visual user output interface, selected objects in a predetermined geospatial area, wherein each of said selected objects includes at least one of a position, a speed, and a course;
    designating an ownship planned track for an ownship, wherein the ownship planned track passes through the predetermined geospatial area;
    calculating by said computer system at least one of a closest point of approach value and a shortest time to transit value for at least one monitored object among said selected objects relative to the ownship planned track based on at least one of the location, the speed and the course of the at least one monitored object; and
    generating by said computer system a map visualization that visually represents each selected object and the ownship planned track spatially on the predetermined geospatial area, and, if the at least one of the closest point of approach value and the shortest time to transit value is below a predetermined distance threshold, visually represents where along the ownship planned track the at least one monitored object will be closest to the ownship.

2. The collision avoidance method for a watercraft navigating to a desired endpoint of claim 1, additionally comprising the step of recalculating by said computer system the at least one of the closest point of approach value and the shortest time to transit value, if, after the map visualization is generated, at least one of the location, the speed and the course of the at least one monitored object changes.

3. The collision avoidance method for a watercraft navigating to a desired endpoint of claim 2, additionally comprising the step of regenerating by said computer system the map visualization each time the step of recalculating is performed.

4. The collision avoidance method for a watercraft navigating to a desired endpoint of claim 1, additionally comprising the step of recalculating by said computer system the at least one of the closest point of approach value and the shortest time to transit value, if, after the map visualization is generated, at least one of the ownship planned track changes.

5. The collision avoidance method for a watercraft navigating to a desired endpoint of claim 4, additionally comprising the step of regenerating by said computer system the map visualization each time the step of recalculating is performed.

6. The collision avoidance method for a watercraft navigating to a desired endpoint of claim 1, additionally comprising the step of generating by said computer system a linear visualization that provides a linear representation of the ownship planned track, and, if the at least one of the closest point of approach value and the shortest time to transit value is below a predetermined distance threshold, provides a linear representation of where along the ownship planned track the at least one monitored object will be closest to the ownship.

7. The collision avoidance method for a watercraft navigating to a desired endpoint of claim 6, additionally comprising the step of recalculating by said computer system the at least one of the closest point of approach value and the shortest time to transit value, if, after the map visualization and the linear visualization are generated, at least one of the location, the speed and the course of the at least one monitored object changes.

8. The collision avoidance method for a watercraft navigating to a desired endpoint of claim 7, additionally comprising the step of regenerating by said computer system the map visualization and the linear visualization each time the step of recalculating is performed.

9. The collision avoidance method for a watercraft navigating to a desired endpoint of claim 6, additionally comprising the step of recalculating by said computer system the at least one of the closest point of approach value and the shortest time to transit value, if, after the map visualization and the linear visualization are generated, at least one of the ownship planned track changes.

10. The collision avoidance method for a watercraft navigating to a desired endpoint of claim 9, additionally comprising the step of regenerating by said computer system the map visualization and the linear visualization each time the step of recalculating is performed.

11. The collision avoidance method for a watercraft navigating to a desired endpoint of claim 1, additionally comprising the step of receiving by said computer system an input related to the ownship speed and course parameters through a courses of action visualization.

12. The collision avoidance method for a watercraft navigating to a desired endpoint of claim 1, additionally comprising the step of initializing by said computer system, wherein the step of initializing includes defining at least one parameter for at least one of the selected objects and defining the predetermined geospatial area.

13. The collision avoidance method for a watercraft navigating to a desired endpoint of claim 1, wherein the step of initializing additionally includes retrieving by said computer system at least one of the selected objects in the predetermined geospatial area from at least one chart data source.

14. A collision avoidance method for a watercraft navigating to a desired endpoint, comprising the steps of:
    initializing a computer system having access to at least one processor and at least one visual user output interface, wherein the step of initializing includes defining at least one parameter for a plurality of selected objects and defining a predetermined geospatial area;
    monitoring by the computer system the plurality of selected objects in the predetermined geospatial area, wherein each of said selected object includes at least one of a position, a speed, and a course;
    designating an ownship planned track for an ownship, wherein the ownship planned track passes through the predetermined geospatial area and the step of designating includes receiving by said computer system an input related to the ownship speed and course parameters through a courses of action visualization;
    calculating by said computer system at least one of a closest point of approach value and a shortest time to transit value for at least one monitored object among said plurality of selected objects relative to the ownship planned track based on at least one of the location, the speed and the course of the at least one monitored object;

generating by said computer system a map visualization that visually represents each selected object and the ownship planned track spatially on the predetermined geospatial area, and, if the at least one of the closest point of approach value and the shortest time to transit value is below a predetermined distance threshold, visually represents where along the ownship planned track the at least one monitored object will be closest to the ownship; and generating by said computer system a linear visualization that provides a linear representation of the ownship planned track, and, if the at least one of the closest point of approach value and the shortest time to transit value is below a predetermined distance threshold, provides a linear representation of where along the ownship planned track the at least one monitored object will be closest to the ownship.

15. The collision avoidance method for a watercraft navigating to a desired endpoint of claim 14, additionally comprising the step of recalculating by said computer system the at least one of the closest point of approach value and the shortest time to transit value, if, after the map visualization and the linear visualization are generated, at least one of the location, the speed and the course of the at least one monitored object changes.

16. The collision avoidance method for a watercraft navigating to a desired endpoint of claim 15, additionally comprising the step of regenerating by said computer system the map visualization and the linear visualization each time the step of recalculating is performed.

17. The collision avoidance method for a watercraft navigating to a desired endpoint of claim 14, additionally comprising the step of recalculating by said computer system the at least one of the closest point of approach value and the shortest time to transit value, if, after the map visualization and the linear visualization are generated, at least one of the ownship planned track changes.

18. The collision avoidance method for a watercraft navigating to a desired endpoint of claim 17, additionally comprising the step of regenerating by said computer system the map visualization and the linear visualization each time the step of recalculating is performed.

19. The collision avoidance method for a watercraft navigating to a desired endpoint of claim 14, wherein the step of initializing additionally includes retrieving by said computer system at least one of the selected objects in the predetermined geospatial area from at least one chart data source.

20. A collision avoidance method for a watercraft navigating to a desired endpoint, comprising the steps of:

initializing a computer system having access to at least one processor and at least one visual user output interface, wherein the step of initializing includes defining at least one parameter for a plurality of selected objects and defining a predetermined geospatial area;

monitoring by the computer system the plurality of selected objects in the predetermined geospatial area, wherein each of said selected object includes at least one of a position, a speed, and a course;

designating an ownship planned track for an ownship, wherein the ownship planned track passes through the predetermined geospatial area and the step of designating includes receiving by said computer system an input related to the ownship speed and course parameters through a courses of action visualization;

calculating by said computer system at least one of a closest point of approach value and a shortest time to transit value for at least one monitored object among said plurality of selected objects relative to the ownship planned track based on at least one of the location, the speed and the course of the at least one monitored object;

generating by said computer system a map visualization that visually represents each selected object and the ownship planned track spatially on the predetermined geospatial area, and, if the at least one of the closest point of approach value and the shortest time to transit value is below a predetermined distance threshold, visually represents where along the ownship planned track the at least one monitored object will be closest to the ownship;

generating by said computer system a linear visualization that provides a linear representation of the ownship planned track, and, if the at least one of the closest point of approach value and the shortest time to transit value is below a predetermined distance threshold, provides a linear representation of where along the ownship planned track the at least one monitored object will be closest to the ownship;

recalculating by said computer system the at least one of the closest point of approach value and the shortest time to transit value, if, after the map visualization and the linear visualization are generated, at least one of the location, the speed and the course of the at least one monitored object changes;

regenerating by said computer system the map visualization and the linear visualization each time the at least one of the closest point of approach value and the shortest time to transit value is recalculated due to changes in at least one of the location, the speed and the course of the at least one monitored object;

recalculating by said computer system the at least one of the closest point of approach value and the shortest time to transit value, if, after the map visualization and the linear visualization are generated, at least one of the ownship planned track changes; and regenerating by said computer system the map visualization and the linear visualization each time the at least one of the closest point of approach value and the shortest time to transit value is recalculated due to changes in the ownship planned track.

* * * * *